United States Patent [19]
Park

[11] Patent Number: 5,671,207
[45] Date of Patent: Sep. 23, 1997

[54] OPTICAL PICKUP APPARATUS FOR PERFORMING MULTI-FOCUSING

[75] Inventor: Song-Chan Park, Kyungki-do, Rep. of Korea

[73] Assignee: LG Electronics, Inc., Seoul, Rep. of Korea

[21] Appl. No.: 579,143

[22] Filed: Dec. 27, 1995

[30] Foreign Application Priority Data

Feb. 23, 1995 [KR] Rep. of Korea ............... 3563/1995
Mar. 3, 1995 [KR] Rep. of Korea ............... 4328/1995

[51] Int. Cl.$^6$ ............................................. G11B 7/00
[52] U.S. Cl. .................. 369/112; 369/94; 369/44.37; 369/109; 369/44.23
[58] Field of Search ................. 369/94, 112, 275.1, 369/109, 110, 44.23, 44.37

[56] References Cited

U.S. PATENT DOCUMENTS

| | | | |
|---|---|---|---|
| 5,446,723 | 8/1995 | Best et al. | 369/94 |
| 5,499,231 | 3/1996 | Fennema et al. | 369/94 |
| 5,526,336 | 6/1996 | Park et al. | 369/94 |
| 5,526,338 | 6/1996 | Hasman et al. | 369/94 |
| 5,563,873 | 10/1996 | Ito et al. | 369/94 |

*Primary Examiner*—Georgia Y. Epps
*Assistant Examiner*—Kim-Kwok Chu

[57] ABSTRACT

An optical pickup apparatus for performing multi-focusing on two disks having different thicknesses by using a beam separating unit to simultaneously read out data of the two disks. The apparatus includes a laser emitting unit for radiating a linearly-polarized laser beam, a diffraction grating for forcing the beam radiated from the laser emitting unit to a main beam and two sub-beams, a collimator lens for changing the beams having passing through the diffraction grating into parallel beams, a first beam separating unit for transmitting and reflecting the parallel beams passed through the collimator lens to separate the parallel beams into two beams, an objective lens for focusing the beams separated via the first beam separating unit, a second polarized beam splitter for separating the beams focused by the objective lens to be reflected from the surface of a disk and separated again by the first beam separating unit, a sensor lens for sensing to radiate the beams separated by the second polarized beam splitter, and photodetector for providing a control signal to enable the reproduction of information of the disk by the beams radiated after passing through the sensor lens.

17 Claims, 10 Drawing Sheets

OPTICAL PICKUP APPARATUS FOR PERFORMING MULTI-FOCUSING

BACKGROUND OF THE INVENTION

1. Field of the Invention

The present invention relates to a optical pickup apparatus for performing a multi-focusing operation, and more particularly to an optical pickup apparatus enabling a multi-focusing for performing a focusing upon two disks having different thicknesses from each other by using a beam separating unit to simultaneous read out data of the two disks.

2. Description of the Prior Art

Figure 1:
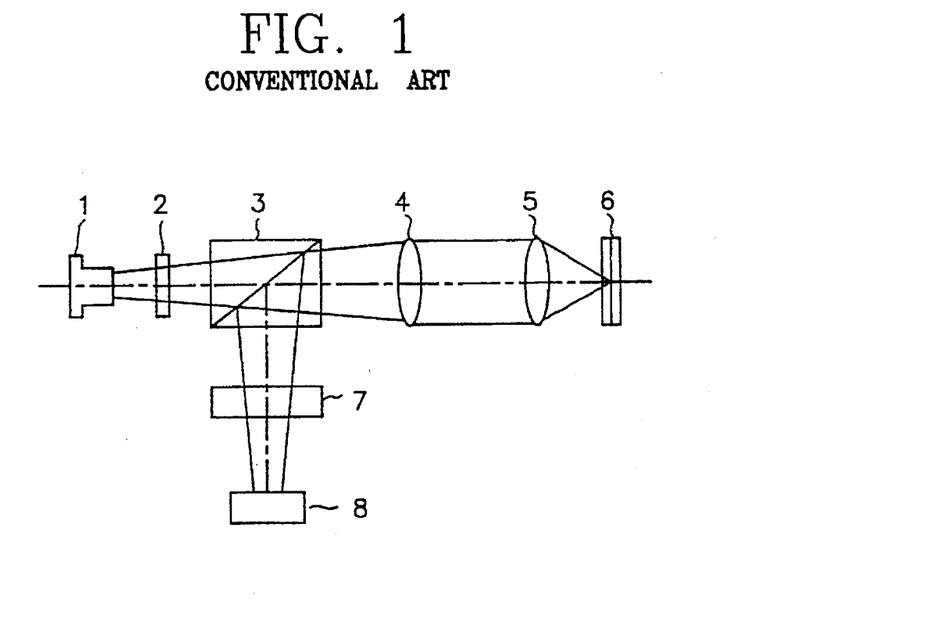
FIG. 1 is a schematic construction view showing a conventional pickup apparatus.

FIG. 1 is a view schematically showing a general optical pickup apparatus which includes a laser diode for emitting a linearly polarized laser beam and a diffraction grating 2 for forcing the laser beam emitted from by laser diode 1 into a main beam and two sub-beams. A collimator lens 4 makes the beam passing through diffraction grating 2 into parallel beams, and an objective lens 5 focuses the parallel beams passing through collimator lens 4. A beam separating prism 3 transmits/reflects the beams focused by objective lens 5 and reflected from a disk 6 in a predetermined ratio (50:50). A sensor lens 7 monitors the beams reflected via beam separating prism 3, and a photodetector 8 monitors the beams passing through sensor lens 7 to provide a signal in accordance with the result of the sensing.

Sensor lens 7 preferably consists of a cylindrical lens to generate astigmatism in the main beam for a focusing servo operation.

Figure 2:
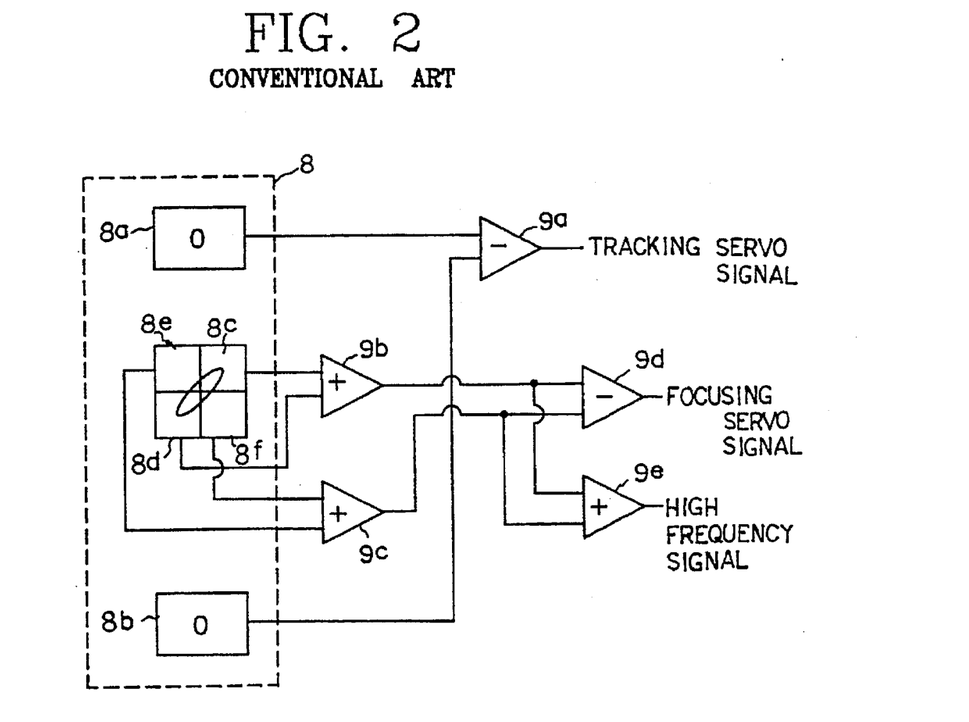
FIG. 2 is a construction view showing a conventional photodiode for producing a servo signal as shown in FIG. 1.

Photodetector 8 is formed by a photodiode divided-by-six which generates a focusing servo signal and a tracking servo signal in accordance with the beams incident via sensor lens 7 and/or generates a signal for reading out information of an optical signal. As shown in FIG. 2, photodetector 8 includes first and second areas 8a and 8b for sensing the two sub-beams (+,−1 order beams), a first comparator 9a for comparing signals resulting from the sub-beams focusing on first and second areas 8a and 8b to generate a difference signal. In addition, a second comparator 9b sums respective signals of the main beam focusing on a third area 8c and a fourth area 8d in the beams passing through sensor lens 7 to produce the result, and a third comparator 9c sums respective signals of the main beam focusing on a fifth area 8e and a sixth area 8f to produce the result. Also, a fourth comparator 9d compares the output signals of second comparator 9b and third comparator 9c to generate a difference signal, and a fifth comparator 9e compares the output signals of second and third comparators 9b and 9c to provide a high frequency signal for reading out an optical information signal.

An operation of the conventional optical pickup apparatus constructed as above will be described below.

First, the linearly-polarized beam from laser diode 1 is radiated to be separated into three beams while passing through diffraction grating 2, and the three beams are formed as the parallel beams by collimator lens 4. The parallel beams are focused by objective lens 5 to be reflected from optical disk 6, so that the reflected beams are partially transmitted and partially reflected in beam separating prism 3. Thus, the reflected three beams pass through sensor lens 7 to reach photodetector 8.

Among the three beams reaching on photodetector 8, the tracking servo signal for adjusting the deviation of the center of the beam landing on optical disk 6 is provided by the sub-beams (+, −1 order beam), and the focusing servo signal for focusing the center of the beam onto the disk center and the high frequency signal for reading out the information on disk 6 are provided by the main beam (0 order beam).

Hereinafter, an aberration created by the beam focusing on the disk after converging by the objective lens will be described.

A beam size A is in the relation that $$A \propto \frac{\lambda}{NA} \quad (1)$$

Also, the spherical aberration B created to the beam focusing to the disk is obtained by:

$$B = \frac{N^2 - 1}{8n^3} (NA) \Delta d \quad (2)$$

(where a reference symbol n denotes a refractive index of the disk, NA is a numerical aperture of the objective lens and $\Delta d$ is the thickness of the disk. A coma aberration C and astigmatism D caused by the beam focusing on the disk are written as:

$$C \propto \frac{\sin\theta \cos\theta (n^2 - 1)d}{(n^2 - \sin^2\theta)^{5/2}} (NA)^3$$

$$D \propto \frac{(n^2 - 1)\sin^2\theta d}{(n^2 - \sin^2\theta)^{3/2}} (NA)^2$$

(where a reference symbol d denotes the thickness of the disk, $\theta$ is the slanted angle of the disk and NA is the numerical aperture of the objective lens.)

Figure 3:
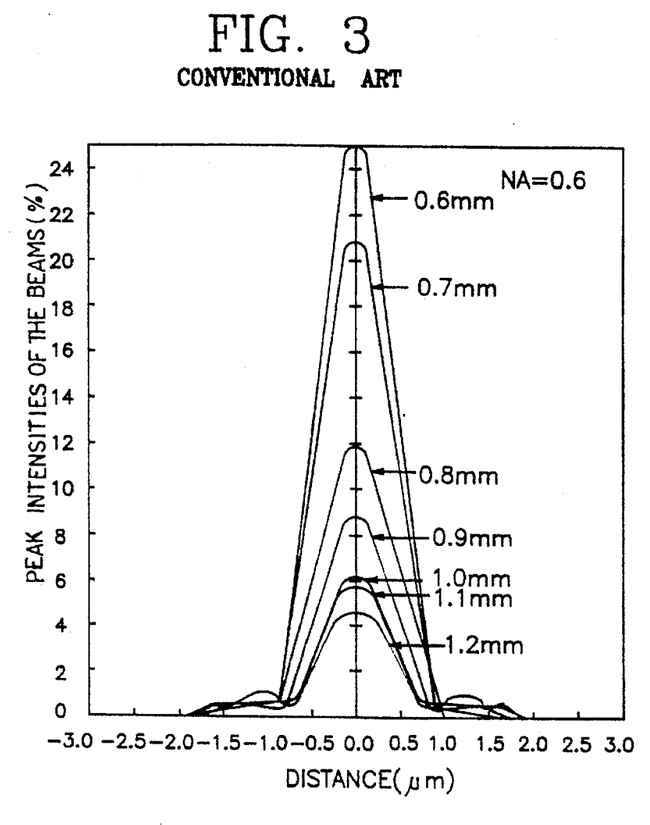
FIG. 3 is a conventional graph representation plotting peak intensities of disks having different thicknesses when the numerical aperture is uniform.

FIG. 3 is a graph plotting peak intensities of the beams with respect to the disks having different thicknesses when the numerical aperture is uniform. As is represented, it can be noted that the peak intensity differs in accordance with the thickness of the disk if the numerical aperture of objective lens 5 is 0.6, and considerable spherical aberration occurs if the thickness of the disk is 1.2 mm.

Figure 4:
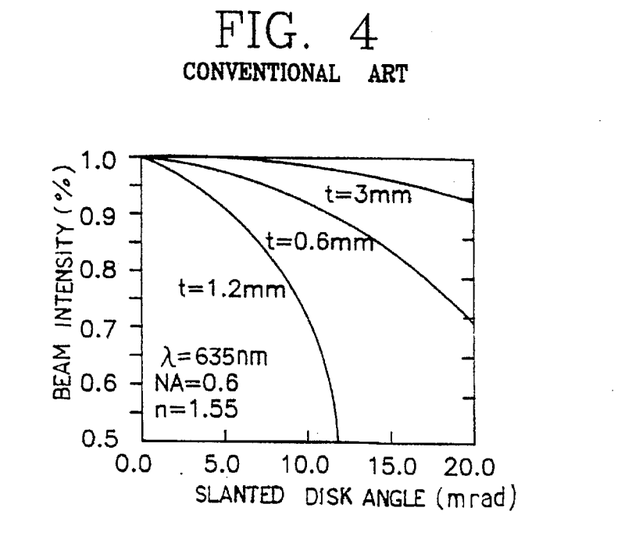
FIG. 4 is a conventional view for showing the distribution of the beam intensities caused by the disk inclination.

On the other hand, the disk is generally slanted when being rotated. As is illustrated, the disk inclination affects the beam intensity the least when the disk thickness is 0.6 mm than 1.2 mm under the state that the numerical aperture of objective lens 5 is 0.6 as shown in FIG. 4 which shows a distribution of the beam intensities according to a slanted disk angle.

Figure 5:
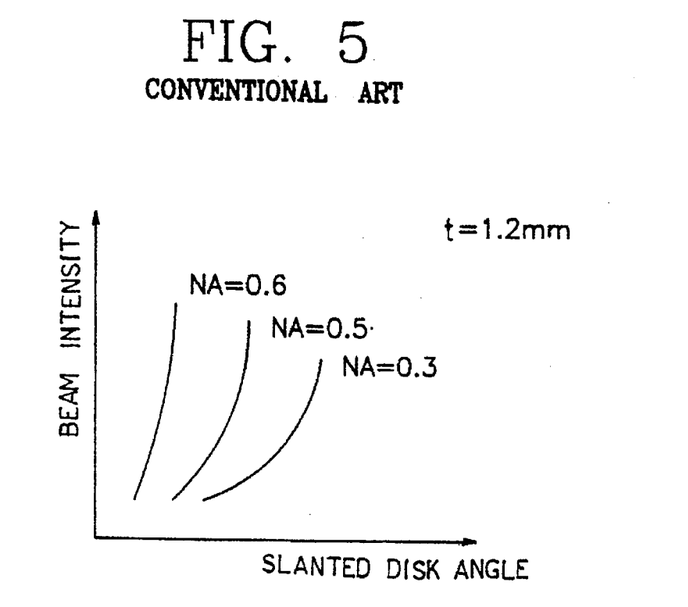
FIG. 5 is a conventional graph representation plotting the distribution of the beam intensities according to the numerical aperture of the objective lens.

FIG. 5 is a graph plotting the distribution of the beam intensities in accordance with the numerical aperture of the objective lens when the disk thickness is 1.2 mm. As is illustrated, the beam intensity with respect to the inclination is affected the least when the numerical aperture is small.

Generally, a compact disk (hereinafter simply referred to as "CD") has a track pitch of 1.6 μm and a digital video disk (hereinafter simply referred to as "DVD") which is a high density disk has that of 0.725 μm. Therefore, since the DVD has the track pitch smaller than that of the CD, the incident beam size should be smaller in terms of the above equation (1). Due to this fact, the DVD is prepared in such a manner that the data can be accurately reproduced by means of the beam focusing on the disk when a wavelength λ of the beam emitting from laser diode 1 is reduced and the numerical aperture of objective lens 5 is increased. Thus, it has been required to standardize the thickness of the disk by 0.6 mm in the DVD which is the high density disk by adjusting the thickness of the typical 1.2 mm CD in order to reduce the influence of the aberration caused by the inclination of the disk.

Figure 6:
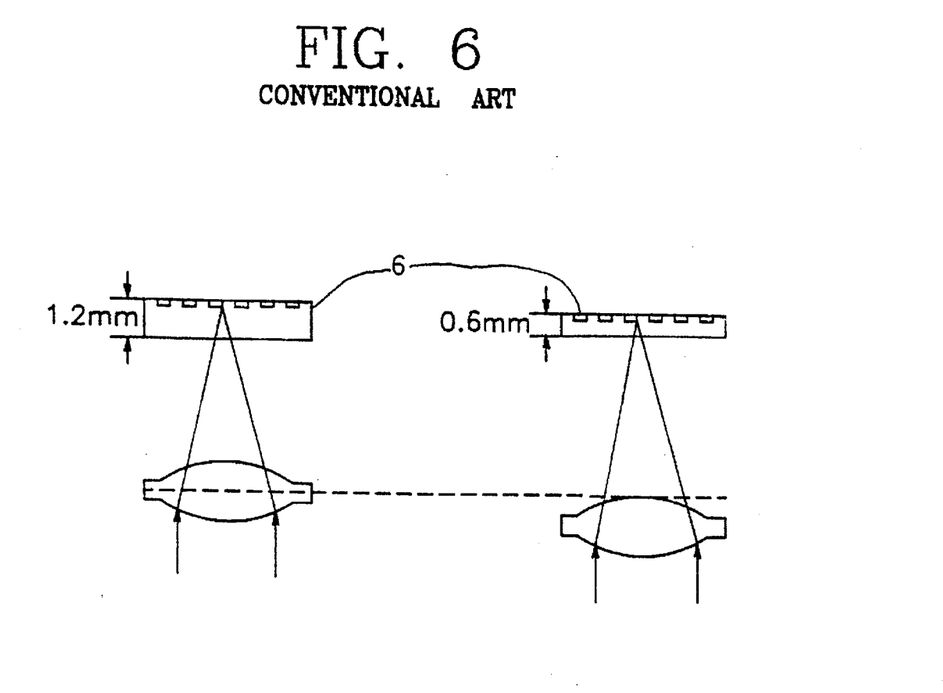
FIG. 6 is a conventional view showing a state of focusing on the disks by means of the optical pickup apparatus shown in FIG. 1.

FIG. 6 is a view showing a state of focusing upon the disks by means of the optical pickup apparatus shown in FIG. 1, which illustrates the sectional views of the general CD of 1.2 mm thick and of the DVD of 0.6 mm thick being the high density disk which has a data storage capacity greater than the CD by as many as four times.

However, the optical pickup apparatus according to the conventional technique constructed as above has problems of being able to read out the CD (1.2 mm thick) solely and unable to readout the accurate data owing to the generation of the optical aberration during the reproduction of the high density DVD (0.6 mm thick).

SUMMARY OF THE INVENTION

It is an object of the present invention to provide an optical pickup apparatus for performing a multi-focusing, in which, in order to solve the problems of being unable to simultaneously reproduce the data of the CD and DVD in the conventional optical apparatus, the incident beams are separated and numerical apertures of the beams incident to an objective lens are differently provided to focus on a CD or DVD for simultaneously reproducing data of the disks with different thicknesses.

To achieve the above object of the present invention, there is provided an optical pickup apparatus for performing a multi-focusing includes a laser emitting unit for radiating a linearly-polarized laser beam, and a diffraction grating for forcing the beam radiated from the laser emitting unit to a main beam and two sub-beams. A collimator lens changes the beams having passing through the diffraction grating into parallel beams, a first beam separating unit transmits and reflects the parallel beams passed through the collimator lens to separate the parallel beams into two beams, and an objective lens focuses the beams separated via the first beam separating unit. A second polarized beam splitter separates the beams focused by the objective lens to be reflected from the surface of a disk and separated again by the first beam separating unit, and a sensor lens senses to radiate the beams separated by the second polarized beam splitter. Also, a photodetector provides a control signal to enable the reproduction of information of the disk by the beams radiated after passing through the sensor lens.

BRIEF DESCRIPTION OF THE DRAWINGS

The above objects and other advantages of the present invention will become more apparent by describing in detail preferred embodiments thereof with reference to the attached drawings in which.

Further scope of applicability of the present invention will become apparent from the detailed description given hereafter. However, it should be understood that the detailed description and specific examples, while indicating preferred embodiments of the invention, were given by way of illustration only, since various changes and modifications within the spirit and scope of the invention will become apparent to those skilled in the art from this detailed description.

DETAILED DESCRIPTION OF THE PREFERRED EMBODIMENTS

An optical pickup apparatus for performing a multi-focusing according to the present invention will now be described.

Figure 7:
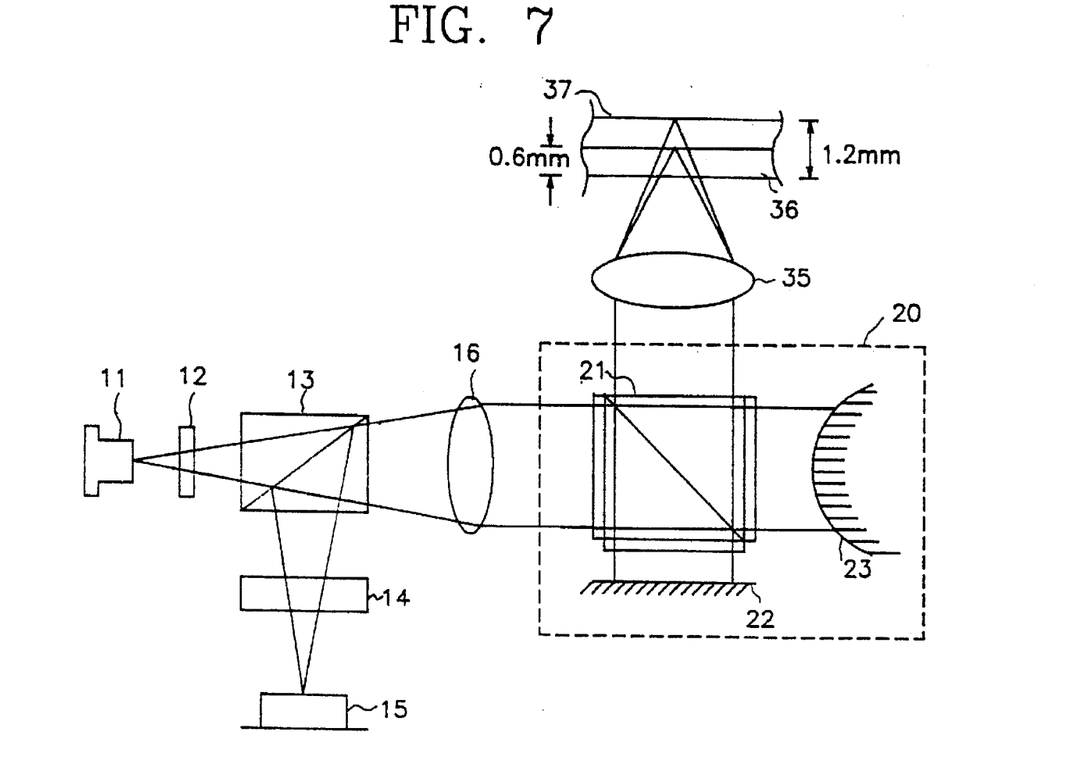
FIG. 7 is a construction view showing a first embodiment of an optical apparatus capable of performing a multi-focusing according to the present invention.

FIG. 7 illustrates a first embodiment of the optical pickup apparatus according to the present invention, in which a laser emitting unit 11 radiates a linearly-polarized laser beam, and a diffraction grating 12 forces the beam emitting from laser emitting unit 11 into a main beam and two sub-beams. Also, a collimator lens 16 permits the beams passing through diffraction grating 12 into parallel beams, and a first beam separating unit 20 transmits/reflects the parallel beams passing through collimator lens 16 to separate the parallel beams into two beams. An objective lens 35 converges the beams separated via first beam separating unit 20, and a second polarized beam splitter 13 separates the beams which are converged by objective lens 35 to be reflected from the surface of the disk and repeatedly separated by first beam separating unit 20. In addition, a sensor lens 14 senses the beams separated by second polarized beam splitter 13 to radiate the monitored beams, and a photodetector 15 provides a control signal for allowing for the reproduction of information of the disk by means of the beams radiated via sensor lens 14.

Preferably, laser emitting unit 11 is a laser diode.

Photodetector 15 is a photodiode divided-by-six.

Figure 8:
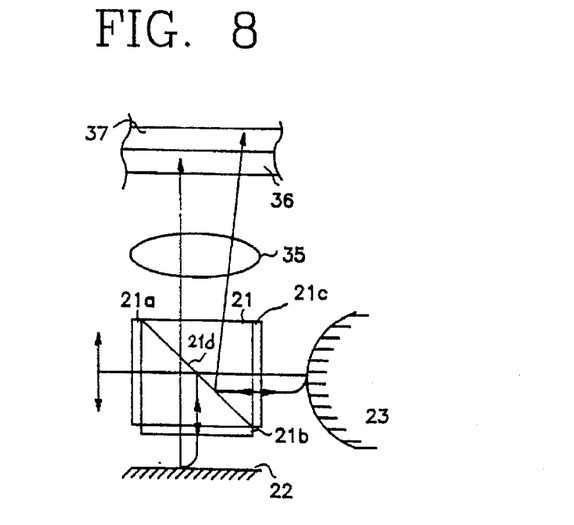
FIG. 8 is a detailed construction view showing the first beam separating unit shown in FIG. 7.

First beam separating unit 20 consists of a first polarized beam splitter 21 for separating the beam passing through collimator lens 16 into a P wave and an S wave, and first and second reflection parts 22 and 23 for respectively reflecting the P wave and S wave converted via first polarized beam splitter 21.

First polarized beam splitter 21 has a boundary plane 21$d$ which transmits the P wave and reflects the S wave. First, second and third wave plates 21$a$, 21$b$ and 21$c$ adhere on three planes except the plane toward objective lens of first polarized beam splitter 21. First and second reflection parts 22 and 23 are placed opposite to second and third plates 21$b$ and 21$c$.

First plate 21$a$ is a $\lambda/2$ plate for rotating an optical axis of the beam passing through collimator lens 16 by as much as 22.5° to force it into the P wave and S wave to be separated into in a predetermined ratio of 50:50. Second and third plates 21$b$ and 21$c$ are $\lambda/4$ plates functioning for converting the P wave into S wave and the S wave into the P wave when the beams reflected (S wave) from boundary plane 21$d$ of polarized beam splitter 21 or transmitted (P wave) beams are reflected from first and second reflection parts 22 and 23.

First and second reflection parts 22 and 23 are a flat mirror and a convex mirror, respectively.

The operation of the incident beams by first beam separating unit 20 is as shown in FIG. 8, in which the linearly polarized beam from laser emitting unit 11 is changed to the three beams by diffraction grating 12 to advance as the parallel beam by collimator lens 16. The parallel beams are convened into the P wave and S wave by first plate 21$a$. Then, the P wave transmits through boundary plane 21$d$ of first polarized beam splitter 21 to be diverging beams by second reflection part 23 and changed into the S wave while passing through third plate 21$c$. After this, the resultant beams are reflected by boundary plane 21$d$ to focus on a second disk 37 incident by objective lens 35.

The S wave reflected from boundary plane 21$d$ of first polarized beam splitter 21 via first plate 21$a$ is reflected by first reflection part 22 and changed into the P wave via second plate 21$b$ to be incident to objective lens 35 as the parallel beams, thereby focusing on a first disk 36.

In the above embodiment, laser emitting unit 11 is rotated by 45° without employing first plate 21$a$ for allowing the linear polarized beam to have a P wave component and an S wave component.

On the other hand, the beams reflected after focusing on first and second disks 36 and 37 and then separated again by first beam splitter unit 20 are partially transmitted (P wave) and reflected (S wave) by second polarized beam splitter 13. Also, the beams separated via second polarized beam splitter 13 are monitored and radiated by sensor lens 14 to be incident to photodetector 15 to output the tracking servo signal, focusing servo signal and high frequency signal via photodetector 15, thereby reproducing the information of the disk.

The output process of the tracking servo, focusing servo and high frequency signals from photodetector 15 is the same as the conventional technique, which thus will be omitted.

Figure 9A:
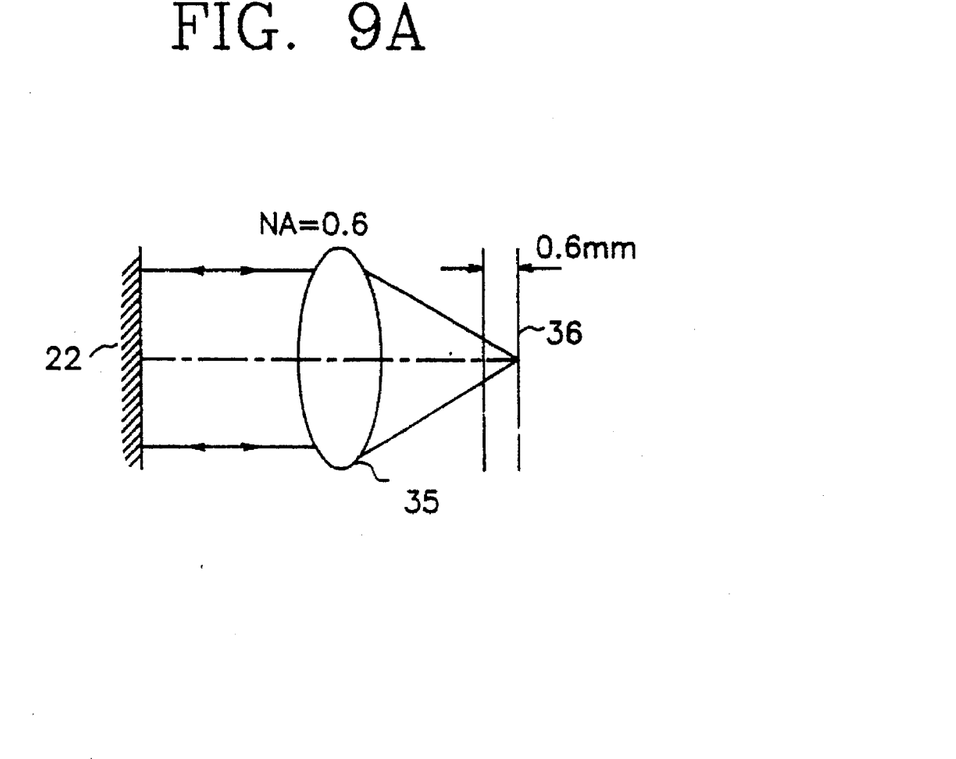
FIGS. 9A and 9B are views showing a state of focusing on the disks by two points in the first embodiment.
Figure 9B:
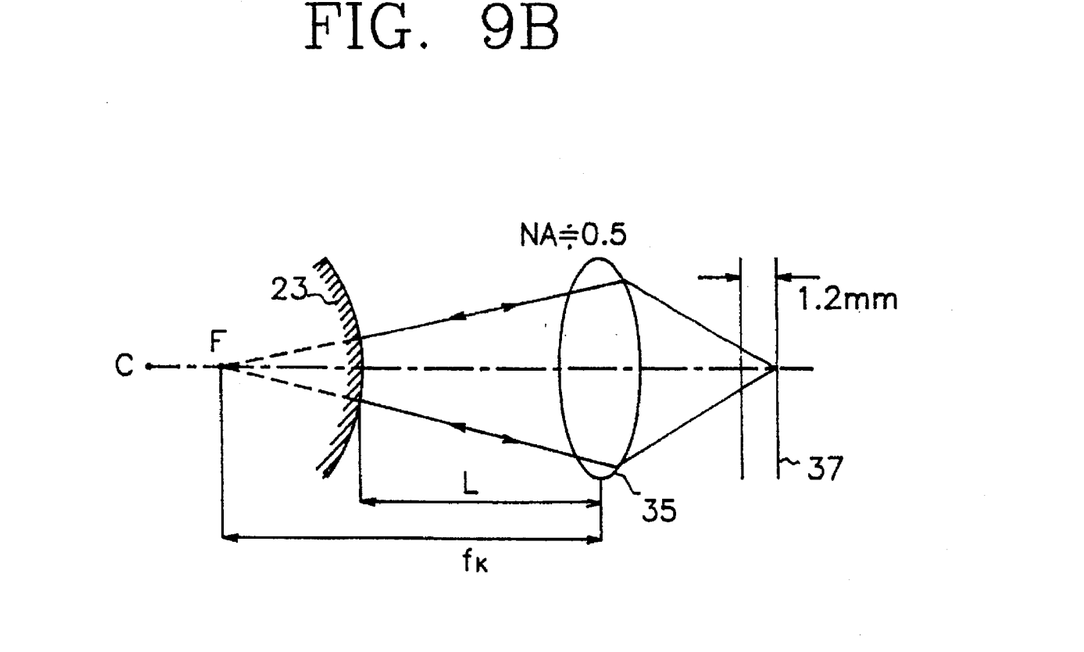

In the first embodiment, when the positions of focusing on first and second disks 36 and 37 are illustrated, as shown in FIGS. 9A and 9B, the P wave reflected by first reflection part 22 focuses on the DVD which is first disk 36, and the S wave reflected by second reflection part 23 focuses on second disk 37 as the diverging beam (in the drawing, a reference symbol F denotes a virtual focus of second reflection part 23, C is a center point, $f_k$ is a distance between virtual focus F and objective lens 35 and L is a distance between the surface of second reflection part 23 and objective lens 35.

The P wave and S wave reflected from first and second disks 36 and 37 having different thicknesses are focused on photodetector 15 to reproduce the data of the disks having different thicknesses.

Figure 10:
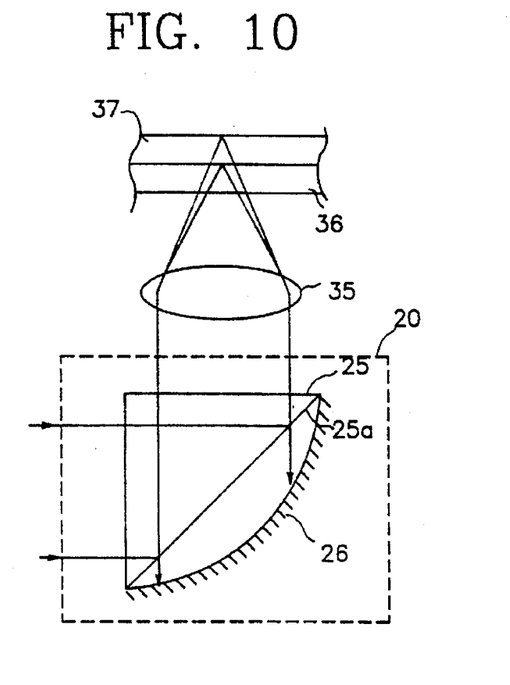
FIG. 10 is a construction view showing a second embodiment of the optical pickup apparatus capable of performing the multi-focusing according to the present invention.

FIG. 10 is a view showing a second embodiment of the present invention, in which the same reference numerals as in the first embodiment denote the same parts in the second embodiment. In the optical pickup apparatus according to the second embodiment, a first beam separating unit 20 is comprised of a third polarized beam splitter 25 having a boundary plane 25$a$ for separating the incident beams and a third reflection part 26 adhered while having a concave plane of a size covering boundary plane 25$a$.

Third reflection part 26 is a parabolic mirror, so that, when the beams radiated by rotating laser emitting unit 11 have the P wave component and the S wave component, the beams are separated into the P wave and S wave in boundary plane 25$a$ of second polarized beam splitter 25 to transmit the P wave and reflect the S wave. Here, the S wave is parallel beams to focus on second disk 37 and the P wave is reflected by the parabolic mirror being third reflection part 26 to be converted by objective lens 35 prior to focusing on first disk 36. After this, the beams reflected from first and second disks 36 and 37 pass through second polarized beam splitter 13 and sensor lens 14 to reach photodetector 15 in the same process as the first embodiment, thereby enabling the simultaneous reproduction of the data from the disks having different thicknesses.

Figure 11:
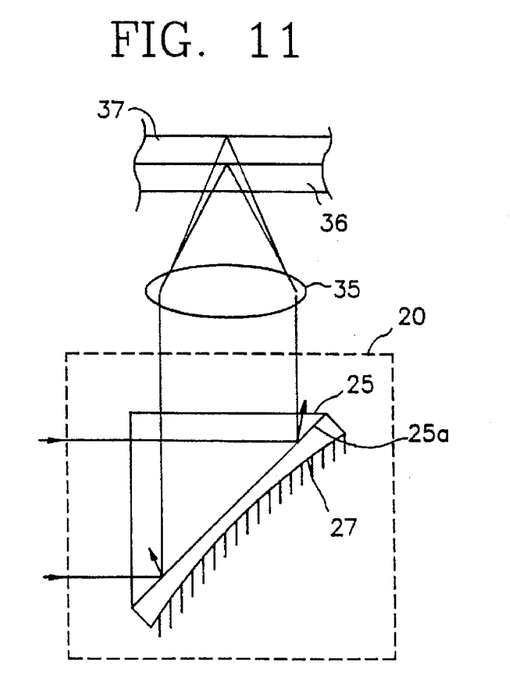
FIG. 11 is a construction view showing a third embodiment of the optical pickup apparatus for performing the multi-focusing according to the present invention.

FIG. 11 shows a third embodiment of the present invention, in which the same reference numerals as in the first embodiment denote the same parts. In the construction of the optical pickup apparatus of the third embodiment, first beam separating unit 20 includes a third polarized beam splitter 25 having a boundary plane 25$a$ for separating the incident beams and a fourth reflection part 27 adhered while having a convex plane of a size covering boundary plane 25$a$.

Fourth reflection part 27 is a non-spherical convex mirror, so that, when the beam radiated by rotating laser emitting unit 11 have the P wave component and S wave component, the beam is separated into the P wave and S wave in boundary plane 25$a$ of third polarized beam splitter 25. Here, the P wave is reflected and S wave is transmitted. Accordingly, the S wave focuses on first disk 36 as the parallel beams, and the P wave is reflected from fourth reflection part 27 to focus on second disk 37 by objective lens 35. After this, the beams reflected from first and second disks 36 and 37 pass through second polarized beam splitter 13 and sensor lens 14 to reach photodetector 15 in the same process as the first embodiment, thereby enabling the simultaneous reproduction of the data from the disks having different thicknesses.

Figure 12:
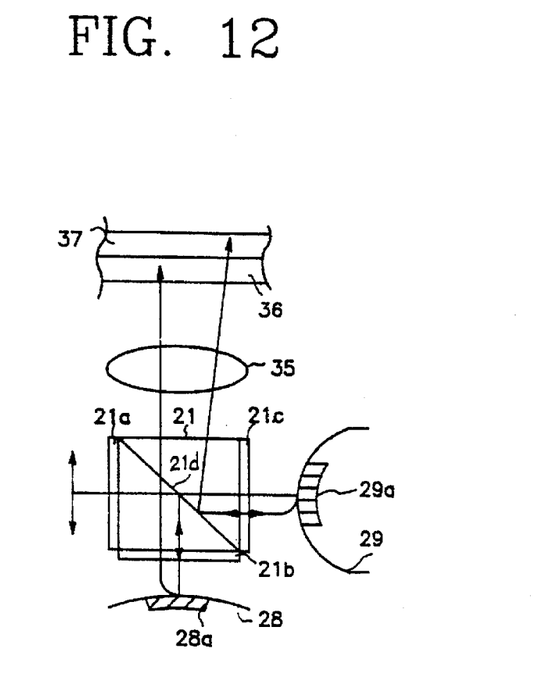
FIG. 12 is a construction view showing a fourth embodiment of the optical pickup apparatus capable of performing the multi-focusing according to the present invention.

FIG. 12 shows a fourth embodiment of the present invention. As illustrated in the drawing, the same reference numerals as in the first embodiment denote the same parts in the construction of the optical pickup apparatus. In the construction of the optical pickup apparatus of the fourth embodiment, first beam separating unit 20 includes a first polarized beam splitter 21 for separating the beam passing through collimator lens 16 into the P wave and S wave, and fifth and sixth reflection parts 28 and 29 for respectively reflecting the P wave and S wave converted via first polarized beam splitter 21. Here, fifth and sixth reflection parts 28 and 29 are convex mirrors and coated with an aluminum substance to differ the size of reflection planes 28a and 29a of fifth and sixth reflection parts 28 and 29. In the fourth embodiment constructed as above, the beams reflected from first and second disks 36 and 37 reach photodetector 15 in the same process as the first embodiment, thereby enabling the simultaneous reproduction of the data from the disks having different thicknesses.

In the fourth embodiment, laser emitting unit 11 is rotated to allow the beams to have the P wave component and S wave component.

Figure 13:
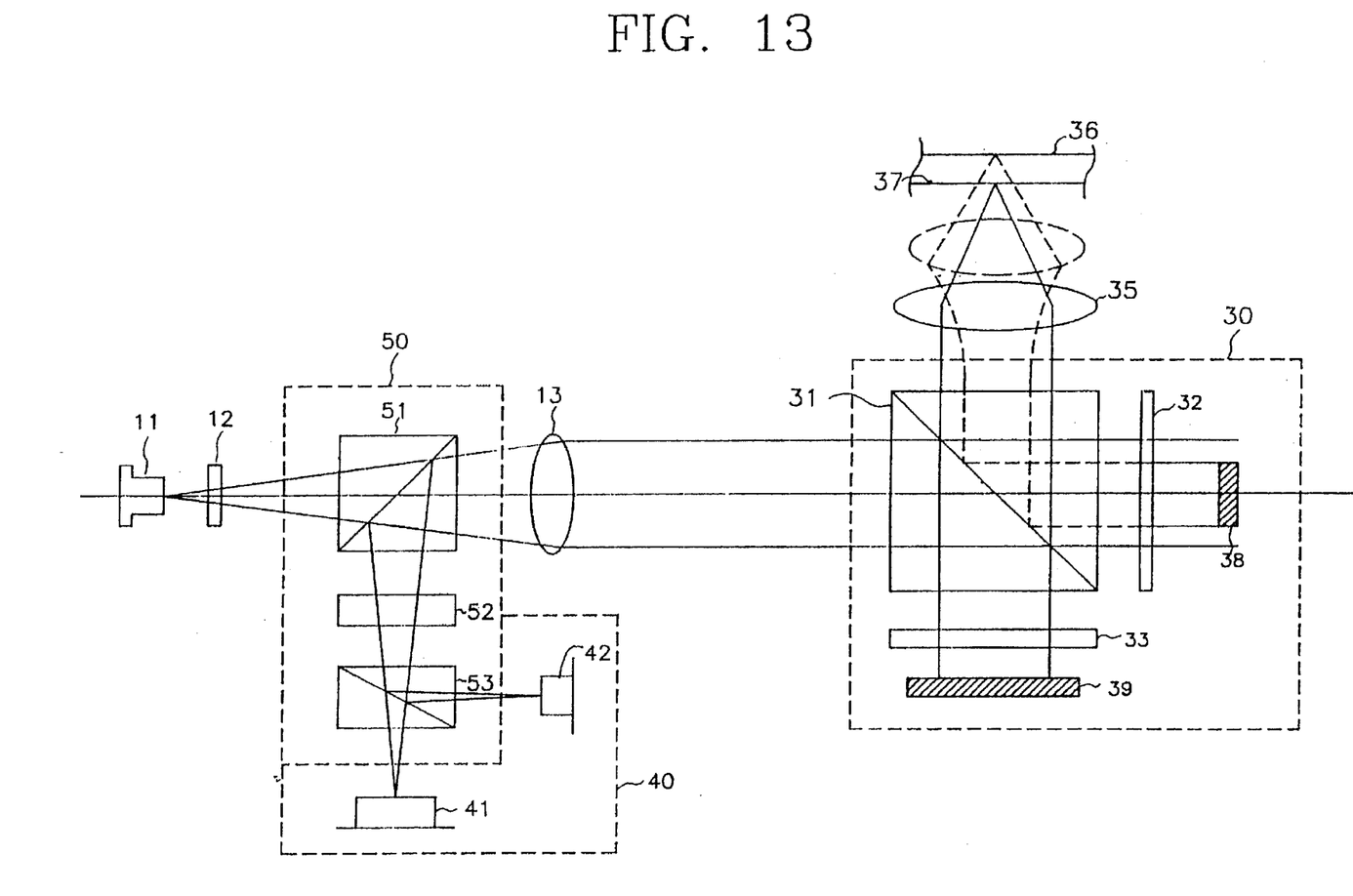
FIG. 13 is a construction view showing a fifth embodiment of the optical pickup apparatus capable of performing the multi-focusing according to the present invention.

FIG. 13 is a construction view showing the optical pickup apparatus for performing the multi-focusing according to the present invention. Here, the same reference numerals as in the first embodiment denote the same parts. The optical pickup apparatus of the fifth embodiment includes a laser emitting unit 11 for radiating a beam having the P wave component and the S wave component, and a diffraction grating 12 for forcing the beam radiated from laser emitting unit 11 into a main beam and two sub-beams. In addition, a collimator lens 13 forms the beam passing through diffraction grating 12 into parallel beams, and a second beam separating unit 30 separates the beams passing through collimator lens 13 into two beams. An objective lens 35 focuses the beams separated via second beam separating unit 30, and a third beam separating unit 50 separates the beams separated by second beam splitting unit 30. Also, a photodetector 40 senses the beams separated by third beam separating unit 50 to provide a control signal for enabling the reproduction of information from first and second disks.

Figure 14:
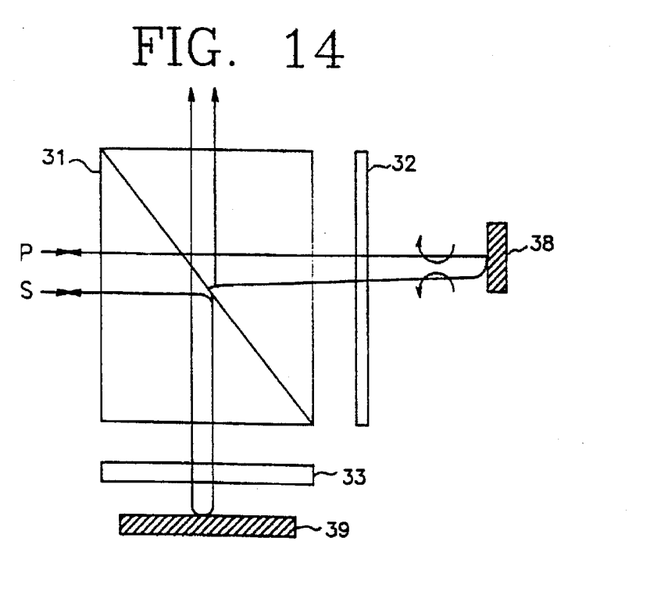
FIG. 14 is a detailed construction view showing the second beam separating unit shown in FIG. 13.

FIG. 14 is a detailed construction view of the second beam separating unit shown in FIG. 13. Second beam separating unit 30 is comprised of a fourth polarized beam splitter 31 for transmitting the P wave and reflecting the S wave in the parallel beams passing through collimator lens 13, a seventh reflection part 38 for fully reflecting the P wave transmitting through fourth polarized beam splitter 31 and an eighth reflection part 39 for fully reflecting the S wave transmitting through fourth polarized beam splitter 31. Fourth and fifth plates 32 and 33 respectively placed between fourth polarized beam splitter 31 and seventh and eighth reflection parts 38 and 39 to convert the P wave into S wave and the S wave into p wave.

Figure 15A:
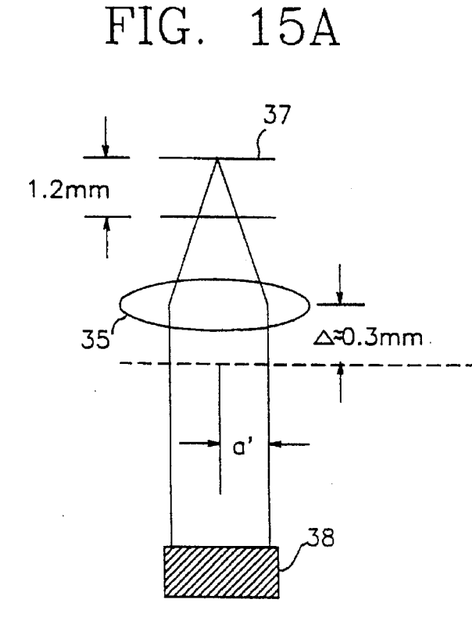
FIGS. 15A and 15B are views showing a state of focusing on the disks by the numerical aperture changed due to the sizes of incident beams according to the optical pickup apparatus shown in FIG. 13.
Figure 15B:
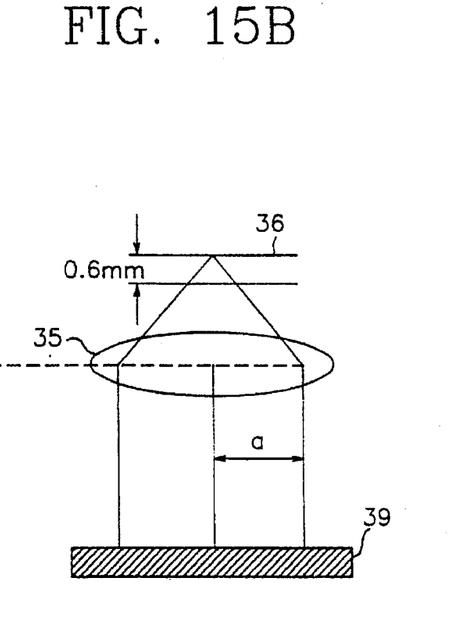

FIGS. 15A and 15B are schematic views showing states that the numerical aperture of the objective lens with respect to the incident beams is changed to focus the beams on the CD and DVD having the different thicknesses. Here, the beams reflected from seventh and eighth reflection parts 38 and 39 to be incident via objective lens 35 after transmitting through and reflecting by fourth polarized beam splitter 31 simultaneously focus on first and second disks 36 and 37 (i.e., the CD and DVD). At this time, provided that the focal distance f of the objective lens is constant (e.g., 3.4), the numerical aperture is defined by:

$$NA = a \text{ (or } a')/f$$

(where a and a' denote the radius of the beams incident to the objective lens.) In accordance with the above relation, the beams focus on the CD or DVD of objective lens 35 in proportion with the radius of the beam reflected from seven and eighth reflection parts 38 and 39. In FIG. 15A, the numerical aperture of objective lens 35 is changed from 0.6 to 0.3 in proportion to the radius (a'=1 mm) of the beam reflected from seventh reflection part 38 to focus on first disk 36. Also, the numerical aperture of objective lens 35 becomes 0.6 in proportion to the radius of the beam (a=2.075 mm) reflected from eighth reflection part 39 to focus on second disk 37 (i.e., DVD). In the drawing, Δ represents a correcting amount of the objective lens, which displays a movement amount of objective lens 35 corrected in accordance with the initially mounted disk.

Third beam separating unit 50 includes a fifth polarized beam splitter 51 for partially transmitting (P wave) and reflecting (S wave) to separate the beams returning via second beam separating unit 30, a sensor lens 52 for sensing to radiate the beams separated by fifth polarized beam splitter 51 and a sixth polarized beam splitter 53 for transmitting the P wave component and reflecting the S wave component in the beams monitored by sensor lens 52.

In addition, a photodetector 40 of the fifth embodiment has first and second photodetectors 41 and 42 which are the photodiodes divided-by six like photodetector 16 in the first embodiment.

Figure 16:
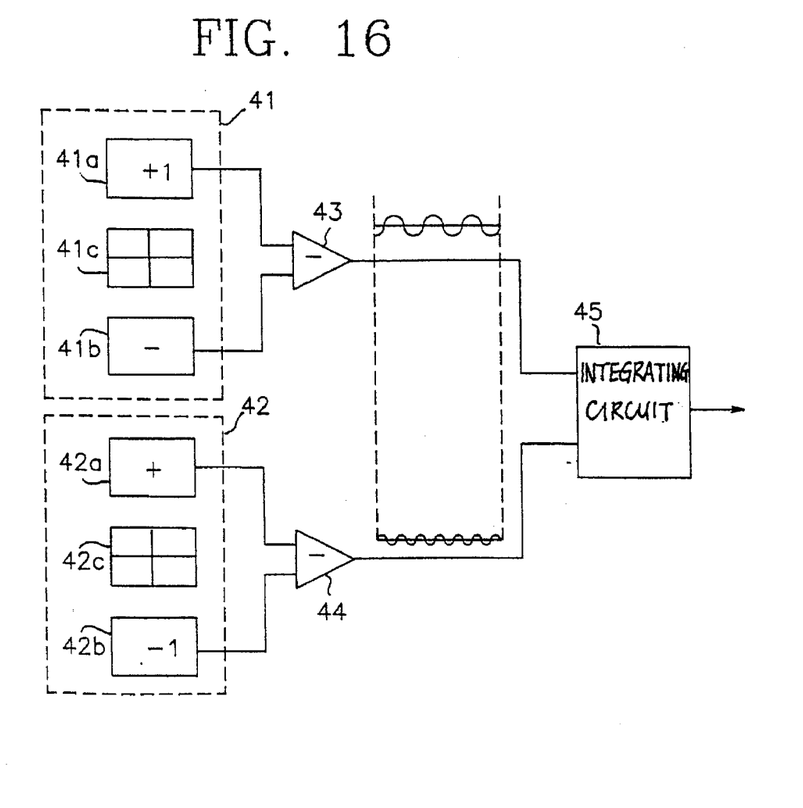
FIG. 16 is a schematic circuit diagram for selecting the tracking servo signal of the disk in the optical pickup apparatus according to the present invention as shown in FIG. 13.

In the fifth embodiment, as shown in FIG. 16, first and second photodetector 41 and 42 of photodetector 40 are electrically connected to input terminals of first and second comparators 43 and 44, and output terminals of first and second comparators 43 and 44 are connected to the input terminal of an integrating circuit 45 to add a function for comparing the tracking servo signals of first and second disks 36 and 37 to provide the result. In more detail, a difference signal from first and second comparators 43 and 44 is integrated to produce the control signal for continuing the tracking servo of the CD when the signal of first comparator 43 is high. Also, when the signal of first comparator 43 is low, the control signal is produced by converting the beams via second photodetector 42 for performing the tracking servo of the DVD. In the optical pickup apparatus, the operation by integrating circuit 45 is such that, since the beam size passing through objective lens 35 to focus on the disk is obtained as equation (1) when using a wavelength (λ=635 nm) of laser emitting unit 11, the beam size exceeds 1.5 μm when NA=0.3 to make the CD have the large signal (high signal) but the DVD which is the high density disk have the smaller signal(low signal) due to crosstalk.

By means of the optical pickup apparatus constructed as above, the CD having the track pitch of 1.6 μm is read out when the numerical aperture of objective lens 35 is 0.3, while the high-density DVD having the track pitch of 0.725 μm is read out when the numerical aperture is 0.6.

An operation of the optical pickup apparatus according to the fifth embodiment will be described as below.

The beam having the P wave component and S wave component is radiated from laser separating unit 11 to be changed into the main beam and two sub-beams by diffraction grating 12, and the beams passing through diffraction grating 12 are changed into the parallel beams by collimator lens 16, so that the parallel beams transmit through fourth polarized beam splitter 31 of second beam separating unit 30 and are reflected by seventh reflection part 38 (e.g., full reflection mirror) to be changed into the S wave via fourth plate 32, and then reflected from fourth polarized beam splitter 31 prior to incoming objective lens 35. Thereafter, the S wave incident to objective lens 35 is reflected from first disk 36 to be changed into the P wave by sequentially passing through fourth polarized beam splitter 31, fourth plate 32 and seventh reflection part 38, thereby transmitting fourth polarizing beam splitter 31. Then, the P wave is reflected from collimator lens 16 and fifth polarized beam splitter 51 to transmit sensor lens 52 and sixth polarized beam splitter 53, and reaches first photodetector 41.

On the other hand, the process of reproducing the data of second disk 37 being the DVD is performed such that the S wave is reflected from fourth polarized beam splitter 31 of second beam separating unit 30 to be reflected by eighth reflection part 39 (e.g., full reflection mirror). Then, the reflected beam is changed into the P wave via fifth plate 33 to focus by objective lens 35 to be reflected from second disk 37 for being changed into the S wave by fifth plate 33. After this, the beam passes through fourth polarized beam splitter 31 and collimator lens 16 to be reflected from fifth polarized beam splitter 51 and is reflected from fifth polarized beam splitter 51. Finally, it passes through sensor lens 52 to be reflected from sixth polarized beam splitter 53, thereby reaching second photodetector 42.

Figure 17:
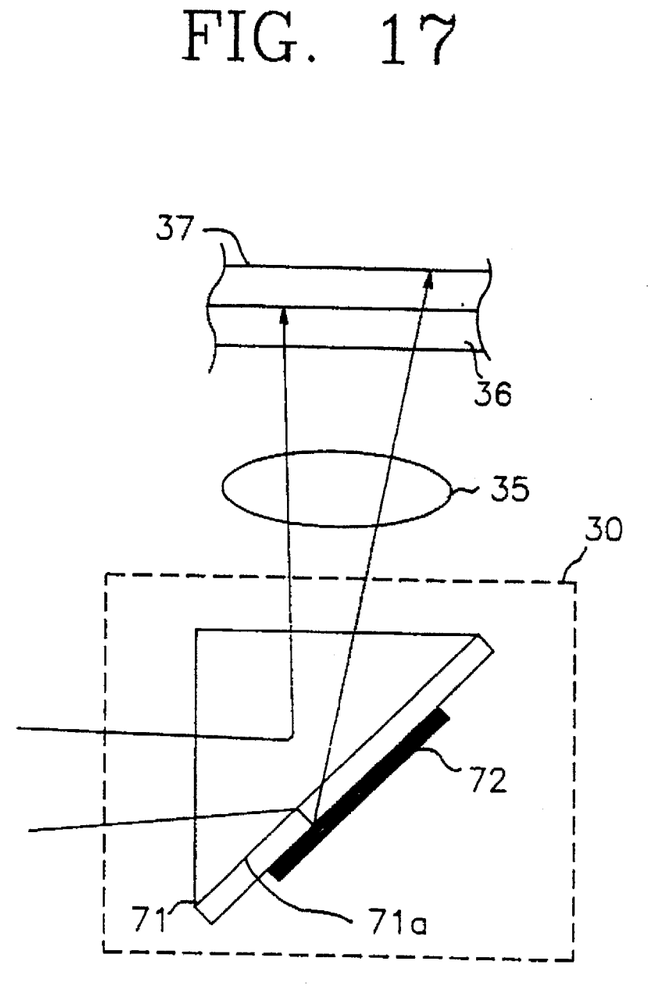
FIG. 17 is a construction view showing a sixth embodiment of the optical pickup apparatus capable of performing the multi-focusing according to the present invention.

FIG. 17 shows a sixth embodiment of the optical pickup apparatus according to the present invention, in which the same reference numerals as in the first embodiment denote the same parts. As illustrated, second beam separating unit 30 in the sixth embodiment includes a seventh polarized beam splitter 71 having a boundary plane 71a for transmitting the P wave and reflecting the S wave in the beams having the P wave component and S wave component radiated from laser emitting unit 11, and a ninth reflection part 72 adhered to boundary plane 71a of seventh polarized beam splitter 71 to reflect the beam transmitting through boundary plane 71a.

In the operation of the optical pickup apparatus according to the sixth embodiment, the beams passing through collimator lens 16 are transmitted through or reflected from boundary plane 71a of seventh polarized beam splitter 71 and focused by means of objective lens 35 to be reflected from first and second disks 36 and 37. Then, the beams are separated by third beam separating unit 50 to reach photodetector 40 to execute the reproduction of the disks.

In the fifth and sixth embodiments of the present invention, laser emitting unit 11 is preferably the laser diode, and the radiated beam may be separated into the P wave component and S wave component by installing a λ/2 plate succeeding collimator lens 16 without rotating laser emitting unit 11 by 45°.

The optical pickup apparatus according to the present invention as described above is equipped with the beam separating unit to simultaneously focus the beam on the CD and DVD at the same time, thereby simultaneously reading out the information of the disks having different thicknesses.

The optical pickup apparatus according to the present invention can be applied as the optical pickup in the optical disks such as the CD-ROM, MD and MODD.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup apparatus for multi-focusing comprising:

laser emitting means for radiating a linearly-polarized laser beam;

a diffraction grating for forcing said beam radiated from said laser emitting means into a main beam and two sub-beams;

a collimator lens for changing said main beam and two sub-beams into parallel beams;

an objective lens fixed with respect to a reference plane;

beam separating means for separating said parallel beams into a first set of sub-beams and a second set of sub-beams wherein said first set of sub-beams having a first focal location and said second set of sub-beams having a second focal location measured from the reference plane when passed through said objective lens, respectively, and each focal location is associated with a disk of a different thickness;

photodetector means for providing a control signal to enable reproduction of information from said focused first set of sub-beams and second set of sub-beams as reflected by the disk.

2. An optical pickup apparatus for performing multi-focusing as claimed in claim 1, wherein said beam separating means comprises:

a first wave plate to separate the parallel beams from said collimator lens into S waves and P waves;

second and third plates for converting P waves into S waves and S waves into P waves, respectively;

a polarized beam splitter having a boundary plane for transmitting the P waves through said boundary plane and reflecting the S waves by said boundary plane;

a first reflection part for forming said first set of sub-beams having parallel type beams from said transmitted P waves; and a second reflection part for forming said second set of sub-beams having diverging type beams from said reflected S waves.

3. An optical pickup apparatus for performing multi-focusing as claimed in claim 2, wherein said first wave plate is a λ/2 plate for separating said parallel beams into said P waves and S waves in a predetermined ratio of 50:50.

4. An optical pickup apparatus for performing multi-focusing as claimed in claim 2, wherein said second and third wave plates are λ/4 wave plates.

5. An optical pickup apparatus for performing multi-focusing as claimed in claim 2, wherein said first and second reflection parts are a flat mirror and a concave mirror, respectively.

6. An optical pickup apparatus for performing multi-focusing as claimed in claim 1, wherein said beam separating means comprises:

a polarized beam splitter having a boundary plane for separating said parallel beams from said collimator lens into P waves and S waves wherein said P waves are transmitted through said boundary plane and S waves are reflected by said boundary plane for forming said first set of sub-beams having parallel type beams; and a reflection part having a concave plane of a size covering said boundary plane for forming said second set of sub-beams having diverging type beams from said transmitted P waves.

7. An optical pickup apparatus for performing multi-focusing as claimed in claim 6, wherein said reflection part is a parabolic mirror.

8. An optical apparatus for performing multi-focusing as claimed in claim 1, wherein said beam separating means comprises:

a polarized beam splitter having a boundary plane for separating said parallel beams from said collimator lens into P waves and S waves wherein said P waves are transmitted through said boundary plane and said S waves are reflected by said boundary plane for forming said first set of sub-beams having parallel type beams; and a reflection part having a convex plane of a size covering said boundary plane for forming said second set of sub-beams having diverging type beams from said transmitted P waves.

9. An optical pickup apparatus for performing multi-focusing as claimed in claim 8, wherein said reflection part is a non-spherical convex mirror.

10. An optical pickup apparatus for performing multi-focusing as claimed in claim 1, wherein said beam separating means comprises:
- a polarized beam splitter having a boundary plane for separating said beams having passed through said collimator lens into said P waves and S waves and transmitting said P waves through said boundary plane and reflecting said S waves by said boundary plane;
- a first reflection part for forming said first set of beams having diverging type of beams from said transmitted P waves;
- a second reflection part for forming said second set of beams having diverging type of beams from said reflected S waves; and wherein
- said first and second reflection parts are convex mirrors to be coated to have different sizes for differing the sizes of said first and second set of diverging type of beams.

11. An optical pickup apparatus for performing multi-focusing as claimed in claim 10, wherein said portions of said first and second reflection parts are coated with aluminum.

12. An optical pickup apparatus for performing multi-focusing comprising:
- laser emitting means for radiating a beam having a P wave component and a S wave component;
- a diffraction grating means for forcing said beam radiated from said laser emitting means into a main beam and two sub-beams;
- a collimator lens for changing said main beam and two sub-beams into parallel beams;
- an objective lens fixed with respect to a reference plane;
- first beam separating means for separating said parallel beams into a first set of sub-beams and a second set of sub-beams; wherein
- said first set of sub-beams having a first focal location and second set of sub-beams having a second focal location measured from the reference plane when passed through said objective lens, and each focal location is associated with a disk of a different thickness;
- second beam separating means for separating said focused first set of sub-beams and second set of sub-beams by said objective lens; and
- an optical detecting means for sensing said beams separated by said second beam separating means to provide a control signal for enabling reproduction of information relating to each focal location.

13. An optical pickup apparatus for performing multi-focusing as claimed in claim 12, wherein said first beam separating means comprises:
- a first wave plate to separate the parallel beams from said collimator lens into S waves and P waves;
- second and third wave plates for converting P waves into S waves and S waves into P waves, respectively;
- a polarized beam splitter having a boundary plane for transmitting the P waves through said boundary plane and reflecting the S waves by said boundary plane;
- a first reflection part for forming said first set of sub-beams having parallel type of beams from said transmitted P waves; and
- a second reflection part for forming said second set of sub-beams having parallel type beams from said reflected S waves; and
wherein said parallel type beams of said first set of sub-beams having a different radius than said parallel type beams of said second set of sub-beams.

14. An optical pickup apparatus for performing multi-focusing as claimed in claim 13, wherein said first and second wave plates are $\lambda/4$ wave plates.

15. An optical pickup apparatus for performing multi-focusing as claimed in claim 13, wherein said first reflection part is a planar mirror perpendicular to the S waves reflected from the boundary plane and said second reflection part is a planar mirror perpendicular to the P waves transmitted from the boundary plane.

16. An optical pickup apparatus for performing multi-focusing as claimed in claim 12, wherein said photodetector means comprises:
- first and second photodetectors;
- first and second comparators; and
- an integrating circuit, wherein said integrating circuit integrates a difference signal from said first and second comparators to provide a signal for a tracking servo relating to the second focal location when the signal of said first comparator is high and provide a signal for a tracking servo relating to the first focal location when said signal of said first comparator is low.

17. An optical pickup apparatus for performing multi-focusing as claimed in claim 12, wherein said second beam separating means comprises:
- a first polarized beam splitter for partially transmitting P waves and reflecting S waves from said beams returning via said first beam separating means;
- a sensor lens for sensing said radiate beams separated via said first polarized beam splitter, and
- a second polarized beam splitter for transmitting P wave components and S wave components in said beams sensed via said sensor lens.

* * * * *